United States Patent
Brochard et al.

[15] 3,677,114

[45] July 18, 1972

[54] POSITIONING THE WORK IN A MILLING LATHE

[72] Inventors: Claude Brochard, Dunkerque; Rene Cossart, Coudekerque-Branche, both of France

[73] Assignee: Creusot-Loire, Paris, France

[22] Filed: Feb. 9, 1971

[21] Appl. No.: 113,830

[30] Foreign Application Priority Data

Feb. 11, 1970 France ................................. 7004748

[52] U.S. Cl. ................................................. 82/2.5, 82/38
[51] Int. Cl. ................................... B23b 13/00, B23b 25/00
[58] Field of Search .......................... 82/2.5, 2.7, 38, 39

[56] References Cited

UNITED STATES PATENTS

| 2,811,884 | 11/1957 | Jones, Jr. | 82/2.5 |
| 2,201,173 | 5/1940 | Hanitz | 82/39 |

FOREIGN PATENTS OR APPLICATIONS

| 13,418 | 7/1901 | Great Britain | 82/38 |

*Primary Examiner*—Harrison L. Hinson
*Attorney*—Cameron, Kerkam & Sutton

[57] ABSTRACT

The driving rollers of a milling lathe are moved into driving position by symmetrical jacks and are interconnected by at least one screw having two threads of opposite pitch. The screw is rotated by a motor without longitudinal movement to move the rollers symmetrically toward or away from the axis of the work.

5 Claims, 5 Drawing Figures

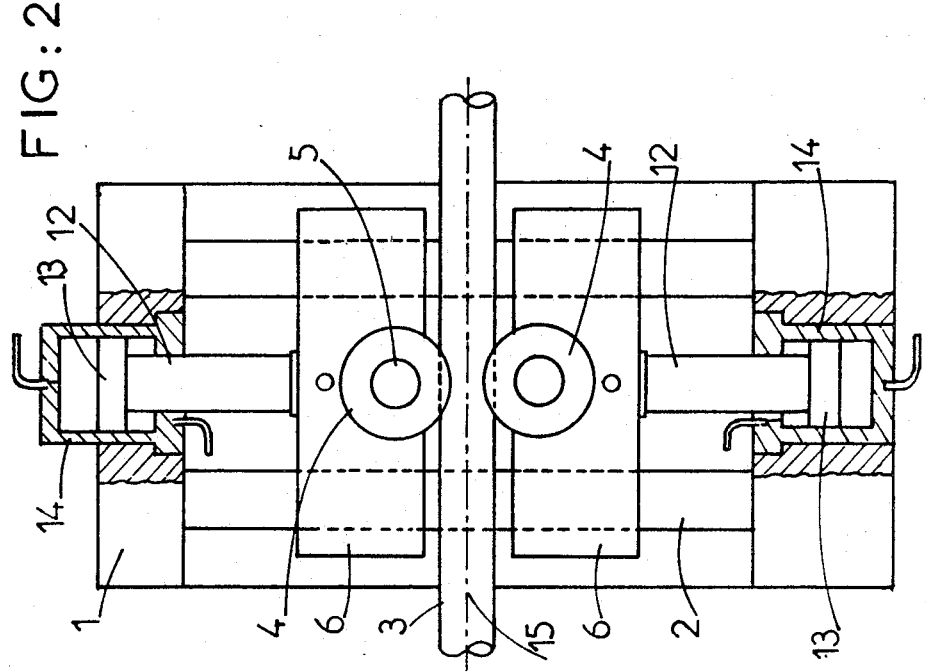
FIG:2
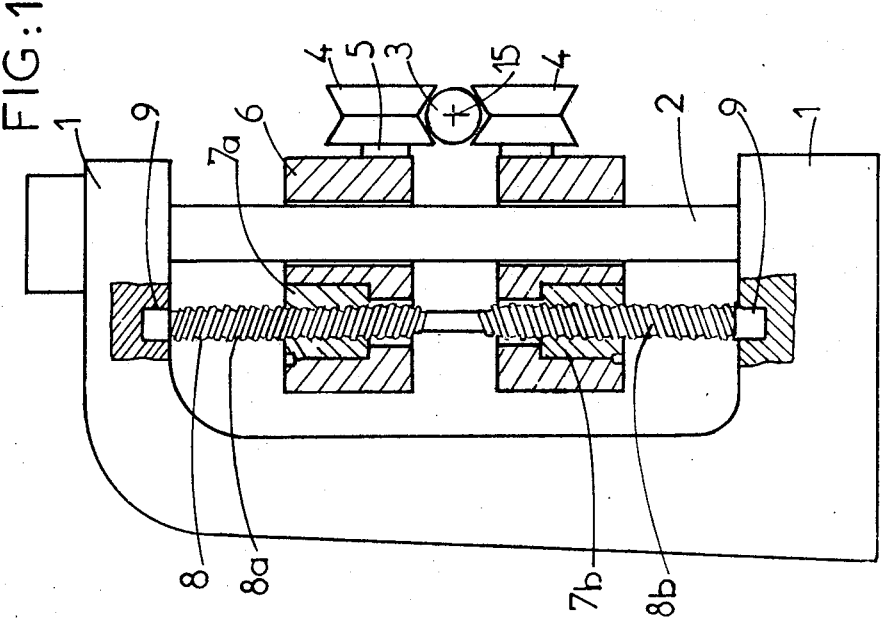
FIG:1

POSITIONING THE WORK IN A MILLING LATHE

BACKGROUND OF THE INVENTION

The present invention refers to a new type of lathe for milling round bars. It is known that a milling lathe comprises the following items:
- a feeding line, provided with guiding rollers;
- a system for moving the bar forward at the entry;
- a spindle, formed by a hollow shaft which supports the tool holding plate;
- a guiding system for the bar at the exit;
- an exit line for the bars.

The present invention refers to an improved milling lathe which provides better operation, a more regular rotation of the spindles and reduced power consumption than that of the known milling lathe. The object of the present invention is to achieve the milling of the round bars with improved precision and economy.

SUMMARY OF THE INVENTION

Therefore the object of the present invention is a milling lathe for round bars, in which the system for moving the bars forward at the entry having at least one set of two symmetrical driving rollers in relation to the axis of the bar to be milled, includes the synchronization and the equal successive displacements of pistons of two symmetrical jacks which control the positioning of the two rollers in relation to the axis of the bar through a reversible system formed of at least one screw with two threads of opposite pitch and mounting two nuts, the screw rotating without longitudinal displacement with the two nuts moving toward or away from the axis of the bar symmetrically in relation to the axis.

According to a particular embodiment of the invention, the system for moving the bars forward at the entry preferably has two sets of two rollers each.

According to another particular embodiment of the invention, each one of the reversible screw-nut systems is formed by a ball screw and by its two nuts.

According to another embodiment of the invention, each one of the reversible screw-nut systems is formed by a roller screw and by its two nuts.

According to another embodiment of the invention, each one of the reversible screw-nut systems is formed by a helical roller screw and its two nuts.

This improvement of the invention will be referred to hereafter as a self-centering gripping device. As can be understood, the invention provides an extremely precise positioning of the guiding rollers of the bar at the entry, and consequently of the bar itself.

Usually, bars, before milling, are not always in true round, and may have slightly differing diameters. When the bars are gripped between the guiding rollers, an effective means for obtaining a convenient gripping regardless of variations of the diameter of the bar, is obtained by exerting a constant force which tends to apply the rollers one on top of the other, usually by means of jacks. But the use of jacks alone does not ensure the correct positioning of the bar. Therefore the present invention is important because it provides constant gripping of the bar and perfect positioning of the bar at the same time.

BRIEF DESCRIPTION OF THE DRAWINGS

In order to better understand the invention a description thereof will be given hereafter, of non-limiting and preferred embodiments thereof as illustrated in the accompanying drawings.

FIGS. 1 and 2 are vertical sections, respectively one in cross-section and one in elevation of a self-centered gripping device according to the invention.

Figure 3:
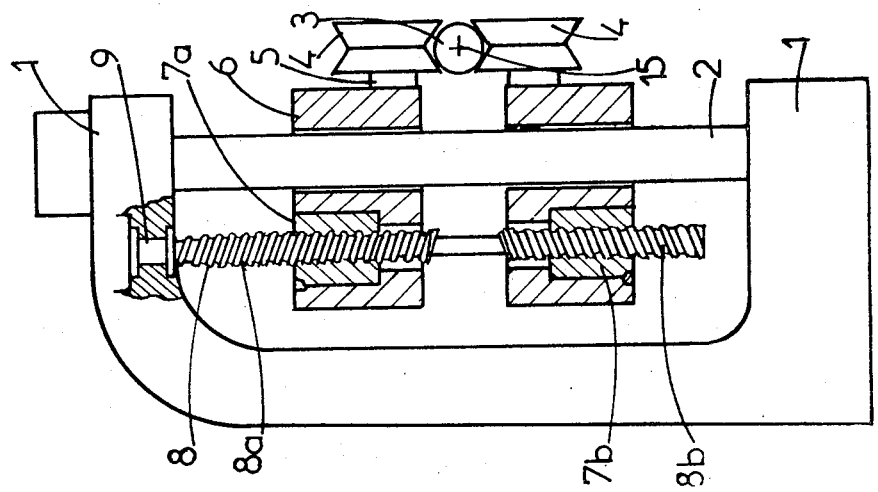
FIGS. 3, 4 and 5 are vertical cross-sections of three different embodiments of the invention.

In these embodiments, the bar to be milled is moved to milling position by a roller line at a speed which can be regulated independently of the forward speed of the engaged bar. This feeding line is of a known type and is not shown on the figures.

The head of the round bar which is moved along by the roller line then engages between the two rollers of a first self-centering gripping device, shown in FIGS. 1 and 2, and then between the two rollers of a second device identical to the first, which second device is not shown in the drawings.

Figure 4:
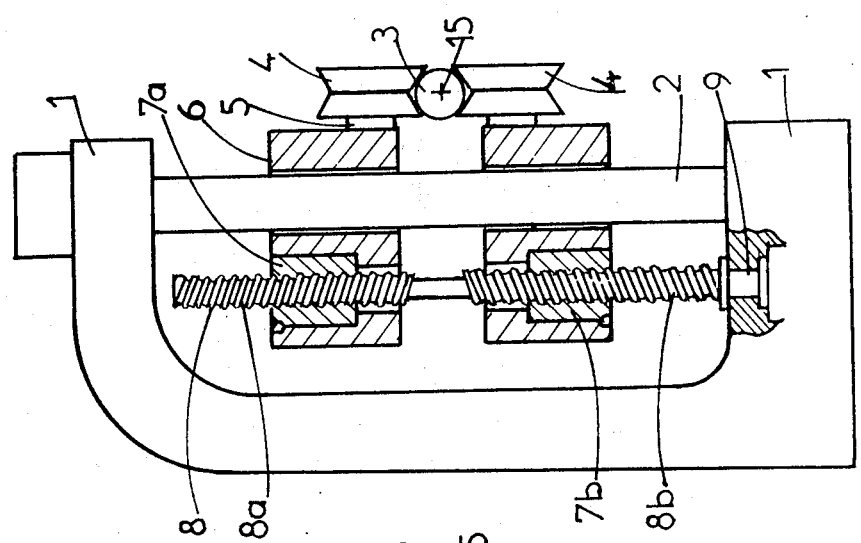
Figure 5:
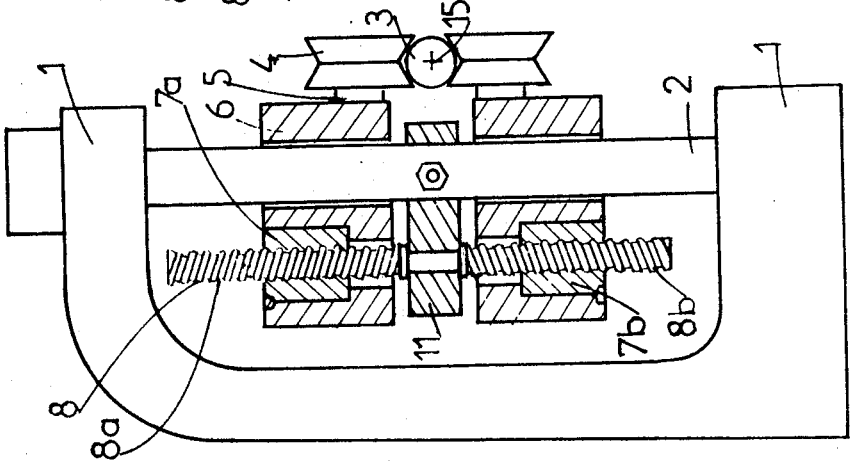

Each one of the two devices consists of a fixed stand 1, provided with two guiding columns 2. The round bar 3 engages between the two gripping rollers 4 of each one of the two gripping devices. The axis 5 of rollers 4 are each permanently fixed to a movable cross-piece 6 sliding along the two guiding columns 2. Ball nuts, roller nuts or helical roller nuts 7a, 7b are mounted in cross-pieces 6 for vertical translational movement therewith along a vertical screw 8 with two threads 8a and 8b which have opposite pitch. Screw 8 is rotated by a control motor of known type not shown in the drawings and rotates without any movement of translation. The blocking of movement of translation of screw 8 can be done in several ways as by rotation of its two ends in housings 9 of stand 1, as shown on FIG. 1; as by a fixed piece 11 permanently fixed to guiding columns 2 of stand 1, and provided with a bearing housing 10 in which the center of screw 8 turns, as shown in FIG. 3; or as by a double effect blocking of only one end of the screw 8, whereby the other end remains free, as shown on FIGS. 4 and 5.

Each one of the movable cross-pieces 6, carrying a roller 4, is moved by a piston 13 which is actuated hydraulically in a cylinder 14.

If there was no self-centering gripping device according to the invention, formed by the screw 8 with its two threads of opposite pitch, and by the two movable cross-pieces 6, moved by the two pistons 13, the movement of the two rollers 4 toward or away from each other would occur in an asymmetrical manner in relation to axis 15, considered as the axis of the spindle and of the tool holder plate (not shown on FIGS. 1 and 2), so that the axis of the round bar would not coincide, or would only partially coincide with the axis 15 of the spindle.

The two self-centering gripping devices according to the invention, of which only one is shown in FIGS. 1 and 2, which are spaced along the bar, provide an excellent centering of the bar with respect to the spindle and to the tool holding plate.

The guiding system for the bar, after milling and before leaving the machine, may or may not conform to the system for moving the bar toward the milling operation, according to the invention, but generally speaking conformity of the systems does not seem to be necessary.

It is to be understood that variations and improvements of the details, as well as the use of equivalent means in the embodiments above-described come within the scope of the present invention.

What is claimed is:

1. Lathe for milling round bars, comprising means for moving the bars forward in the lathe including at least one set of two driving rollers symmetrical in relation to the axis of the bar to be milled, cylinder and piston jacks moving said rollers into engagement with the bar, a reversible system controlling the position of said rollers with respect to the axis of the bar including at least one screw with two threads of opposite pitch and a nut on each of said treads, said screw rotating without longitudinal displacement, whereby said nuts move toward or away from the axis of the bar symmetrically with respect thereto.

2. Milling lathe according to claim 1, said means for moving the bars forward includes two sets of two rollers each.

3. Miiling lathe according to claim 1, said screw being a ball screw.

4. Milling lathe according to claim 1, said screw being a roller screw.

5. Milling lathe according to claim 1, said screw being a helical roller screw.

* * * * *